Sept. 21, 1965  R. E. BRADDON ETAL  3,207,206
PROJECTION SCREENS
Filed Feb. 26, 1962  2 Sheets-Sheet 1

INVENTORS
RALPH E. BRADDON
CHARLES EDWIN BRADDON
BY Watts & Fisher
ATTORNEY

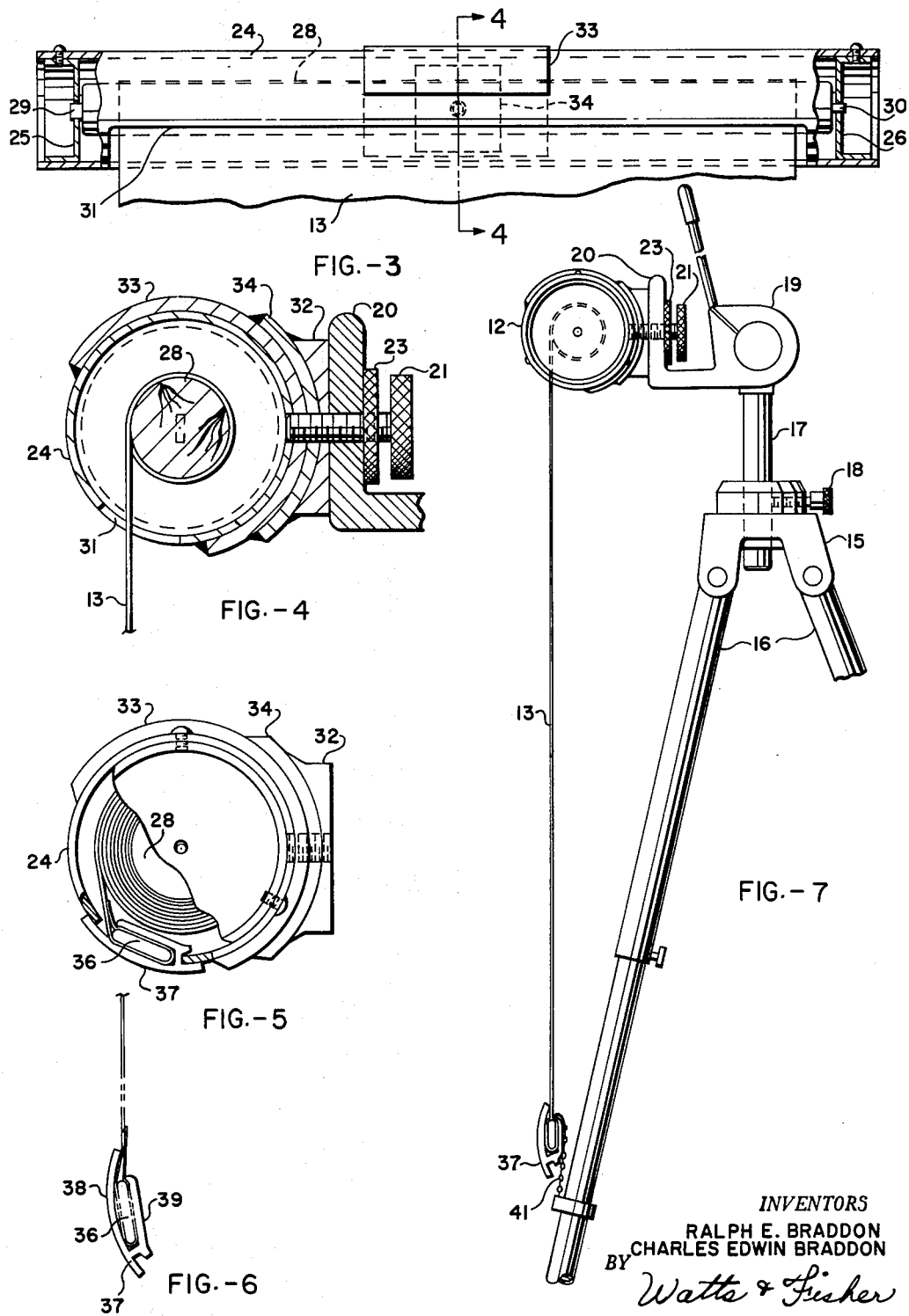

3,207,206
PROJECTION SCREENS
Ralph E. Braddon and Charles Edwin Braddon, both of 1436 E. 86th St., Cleveland, Ohio
Filed Feb. 26, 1962, Ser. No. 175,588
2 Claims. (Cl. 160—24)

This invention relates generally to projection screen assemblies, and more specifically to a novel slide and movie screen assembly which is an adjunct to a conventional camera tripod.

Almost every home movie enthusiast is aware of the irksome problems associated with conventional projection screen assemblies. The most common of these conventional constructions comprises a tubular or box-like screen housing and a collapsible stand which is similar to a music stand. The screen housing is usually pivotally connected to the stand so that it can be swung from a horizontal position to a vertical position in axial alignment with the collapsed stand for transport and storage.

The major objection to the foregoing conventional construction is that the housing and collapsing stand form an integral unit of considerable size, which at best, is very inconvenient to handle. When a user wishes to show movies or slides at another's home, he must collapse his movie screen, pack it in a special carrying case, and then carry the collapsed assembly along with the rest of his paraphernalia, including the projector. Finally, the user must unpack his gear and again set up the screen assembly. As is often the case, the user either forgets to bring his movie screen or simply does not want the trouble involved and relies upon a bed sheet or wall to serve as the projection screen.

Another problem is the lack of stability of most prior art projection screen assemblies. The usual screen housing is much heavier than the stand so that the erected assembly is top-heavy. Further, when the housing is disposed in the horizontal viewing position its ends extend far beyond the base provided by the three-legged support stand. Because of these conditions of top-heaviness and over-hang, the assembly is extremely awkward to set up. Once erected, the assembly can be toppled over rather easily.

Many attempts have been made in the past to modify the basic construction of the conventional projection screen assembly so that it will be more compact in size and easier to handle. However, most of these prior art efforts have added to the structural complexity of the assembly and have increased its cost. As a result, the known projection screens are relatively expensive and usually are very difficult for uninstructed users to set up.

An object of the present invention is to provide an improved projection screen having a construction and a manner of use which alleviates the difficulties and problems of the prior art.

Another object of the invention is to provide a projection screen which is convenient to handle and which can be set up easily for viewing.

A further object of the invention is to provide a projection screen which is light-weight, inexpensive and of relatively simple construction.

Still another object of the invention is to provide a projection screen which is adapted for use as an adjunct to normally available camera equipment.

Yet another object of the invention is to provide a projection screen which forms a part of a stable assembly when erected for viewing.

The foregoing objects are attained and the problems of the prior art are overcome by the present invention through the provision of a light-weight, tubular screen housing which is adapted to be connected to the mounting plate of an ordinary camera tripod. As contemplated in the preferred embodiment of the invention, a projection screen is mounted on a spring-operated roller similar to a common window shade roller or its equivalent, which is mounted in the housing.

In use, the housing can be quickly attached to the mounting plate of the tripod by means of the connecting thumb screw which is normally provided in the camera mounting plate. When the tripod is extended to its full height, the screen can be unrolled from the housing to provide a viewing surface for movies and slides.

It will be apparent from the foregoing general description of the invention that novel use of a camera tripod, which most users already have available as part of their camera equipment, eliminates the need for the usual collapsible support stand for the prior art. Thus, it is only necessary for one to purchase the relatively inexpensive housing and screen.

As distinguished from the difficult and awkward steps involved in setting up conventional projection screen assemblies, the light-weight screen housing of the invention can be easily and quickly mounted on the camera tripod. Once connected to the relatively heavy tripod, which commonly has a wider base than the usual music stand type of support, the projection screen assembly is very stable and cannot be knocked over easily.

Another distinct advantage is that it is usually necessary to carry only the screen housing from place to place, since a camera tripod is normally available as part of customary camera equipment. Present day camera tripods are commonly much more convenient and adaptable than they once were, having telescoping legs with rubber tips, and rotating, tilting, locking and frequently elevating heads, all of which features contribute to speed and convenience in their use. The invention takes advantage of these many features and thus avoids the objectionable task of disassembling and assembling the collapsible support stand of the prior art.

Other objects and a fuller understanding of the invention may be had by referring to the following description and claims taken in conjunction with the accompanying drawings in which:

FIGURE 3 is a fragmentary front view, partially in section, showing the tubular housing of the projection screen assembly;

FIGURE 4 is a sectional view taken on the line 4—4 of FIGURE 3;

FIGURE 5 is an end view, with portions broken away, of the tubular housing as illustrated in FIGURE 3;

FIGURE 6 is a detail view of the retainer stick attached to the bottom edge of the screen; and, FIGURE 7 is an enlarged, foreshortened, side elevation of the projection screen assembly of the invention.

Figure 1:
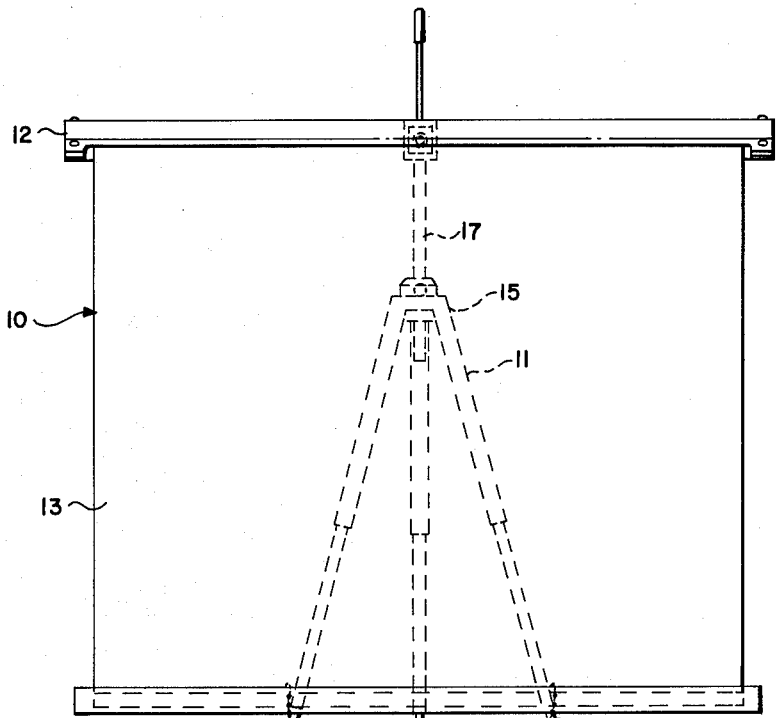
FIGURE 1 is a front elevation of the projection screen assembly of the invention.
Figure 2:
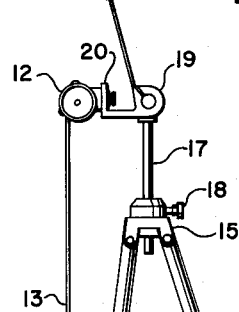
FIGURE 2 is a side elevation of the projection screen assembly shown in FIGURE 1.

Referring now to the drawings, which show the preferred embodiment of the invention, an erected projection screen assembly is indicated generally by the reference character 10 in FIGURE 1. The projection screen assembly 10 includes a camera tripod 11, a tubular screen housing 12 supported in the horizontal position by the tripod 11, and a reflecting screen 13 mounted in the tubular housing 12. The screen 13 is convolutely rolled within the tubular housing 12 for storage and is unrollable to present a vertical plane surface for picture viewing purposes.

The camera tripod 11 is typical of those used by camera owners. As shown, the tripod 11 has a tripod base 14 and three legs 16 pivotally secured thereto. Each of the legs 16 are independently extensible to increase the height of the tripod base plate 15 and to permit the tripod to be erected on an unlevel floor or ground. An elevator post 17 is provided and passes through the head plate of the tripod. The elevator post 17 is adjusted and held in place by a screw 18, although a clamp or rack and pinion may also be used.

A tripod head 19, including a camera mounting plate 20, is secured to the top of the elevator post 17. The tripod head 19 is adjustable by rotation on vertical and horizontal axes which can be fixed by a conventional clamping mechanism. The mounting plate 20 carries a camera locking screw 21 in the form of a threaded stud having a knurled head. A knurled lock nut 23 is provided to fix the locking screw 21 in its locking or clamping position.

The foregoing tripod construction is recommended as being conventional and the details of its structure form no part of the present invention, although it is preferable that the camera mounting plate 20 should be tiltable forward from the horizontal to approximately a vertical position.

In accordance with the present invention, a projection screen housing 12 is attached to the camera mounting plate 20. As shown in FIGURES 3, 4, 5 and 6, the housing 12 includes a cylindrical tube 24 and a pair of axially spaced end caps 25, 26 removably secured to different ends of the tube 24. The end caps 25, 26 are provided to rotatably support a projection screen storage drum and spindle 28 within the housing 12. The drum 28 is similar to a window shade roller and includes a conventional roller spring and catch assembly (not shown) operated by a rectangular pin 29 at one end. A circular roller pin 30 projects from the other end of the drum 28. The end cap 25 is provided with a slotted hole to receive the rectangular pin 29 so as to control and operate the roller spring and catch. The end cap 26 is provided with a circular hole to take the simple roller pin 30.

The projection screen 13 it attached to the storage drum 28 by any suitable device. The screen 13 is a flexible sheet of cloth, plastic or metal which provides a suitable reflecting surface for the viewing of images projected from slides or motion picture film. A conventional white window shade may also serve as the screen.

The housing 12 is provided with a longitudinal slot-like opening 31 to permit the projector screen 13 carried on the drum 28 to be extended for picture viewing purposes. The width and length of the slot are sized to conveniently clear the screen for extending and extraction and to provide a seat for an enclosure member attached to the free end of the screen which will be described later.

A flat-faced bolster 32 is secured to the tubular housing, as by welding, midway of its length to provide a flat mounting surface conforming to the surface of the plate 20. The bolster 32 has a centrally located hole, tapped to receive the camera locking screw 21. Semi-cylindrical reinforcing plates 33, 34 are provided between the tubular housing and the bolster to reinforce the tubular housing. The reinforcing plate 33 surrounds the midsection of the tubular housing, except for the slot 31. The bolster 32 is secured to the reinforcing plates 33, 34 so that its center axis is radially at right angles to the slot 31 such that the slot opens downward when the housing is positioned for use.

In use, the tubular housing 12 is removably secured to the tripod head 19 by juxtapositioning the flat surface of the bolster pad 32 against the camera mounting plate 20 with the tapped hole axially in line with the camera locking screw 21, and by threading the camera locking screw 21 into the hole. After the camera locking screw is tightened, the screen housing is readily orientated and located in proper relation to the projector by manipulation of the tripod head. In the preferred construction of the tubular housing the slot 31 is orientated for proper extension of the screen by rotating the tripod head such that the camera mounting plate 20 is in a substantially vertical position.

The lower edge of the screen 13 is wrapped around or held by clamping action to a stiffening member 36, such as a stick or rod. As shown in FIG. 6, this stick is inserted in a housing strip or enclosure member 37 which clasps the slot 31 in the main screen housing where the screen is retracted. The stick assembly 36, 37 also acts as a stop to prevent the end of the screen from being lost in the housing when the screen is retracted to the storage position. Preferably, the member 37 is made of plastic, metal, or other suitable material, and includes an outside curved wall portion 38 and a back-up portion 39 so that the stick or rod 36 can be inserted firmly between them.

The stiffener member 36 and the clamping strip 37 obviously may take several forms and may also be combined into a single member which attaches to the end of the movie screen. Regardless of the form and construction, its function is to prevent the free end of the screen from being lost inside the housing and to provide a smooth outside contour, preferably filling out and matching the form of the housing. The invention also contemplates the provision of sliding clips or pins to secure the enclosure member in place. The inherent tension of the spring roller will reduce the strain on these fasteners to hold the screen in the retracted position thus making the housing into a neat, compact unit.

A chain or cord 41 is provided to attach the free end of the extended projection screen to the forward leg or legs of the tripod. Securing the screen in this manner reduces the possibility of a disturbance or distortion of its reflecting surface because of contact or air currents.

Although the application describes the invention in detail, it is believed to comprise essentially a camera tripod including a tiltable camera mounting plate, a screen support housing removably secured to the camera mounting plate, and a screen carried by the support housing, whereby the camera mounting plate is rotated to orientate the support housing so that the screen can be vertically arranged.

As will be apparent, the screen support housing is constructed to serve as an adjunct to a conventional camera tripod and does not require any modification of the tripod. The housing can be easily and quickly connected to the tripod when setting up the projection screen assembly for use and also serves as a carrying means for the screen. To this latter end, the housing may obviously be provided with a handle, if desired.

Other modifications and variations of this invention will be apparent to those skilled in the art in view of the foregoing disclosure. Therefore it is to be understood that, within the scope of the appended claims, the invention can be practiced otherwise than as specifically shown and described.

What is claimed is:

1. In a projection screen assembly including a camera tripod having legs, a vertically adjustable post, a camera mounting plate carried by said post, and a threaded member extending through said camera mounting plate, the combination with said tripod of a tubular screen housing, a projection screen storage drum mounted in said housing, said housing having an opening slot so that a screen carried by said drum can be extended therethrough, and a bolster plate connected to said housing intermediate its ends, said bolster plate having a mounting surface conforming to the surface of said camera mounting plate and a tapped hole in said mounting surface adapted to receive said threaded member so that said housing can be fixed to said camera mounting plate by screwing said threaded member into said hole.

2. The assembly as claimed in claim 1 including a closure member secured to the free edge of said screen, said member being shaped to abut the edges of said slot opening when said screen is rolled on said storage drum in said housing, and said member having a faired outer surface substantially conforming to the outer contour of said housing.

(References on following page)

References Cited by the Examiner

UNITED STATES PATENTS

| | | | |
|---|---|---|---|
| 894,918 | 8/08 | Tomlinson | 160—24 |
| 1,576,840 | 3/26 | Meyer | 160—351 |
| 1,780,225 | 11/30 | De Moulin | 94—86 |
| 2,042,443 | 5/36 | Buckstone | 160—24 |
| 2,346,274 | 4/44 | Raven | 160—24 |
| 2,508,122 | 5/50 | Mooney | 248—161 |
| 2,812,810 | 11/57 | Nicholas | 160—24 |
| 2,939,526 | 6/60 | Nicholas | 160—24 |

FOREIGN PATENTS 120,918 2/48 Sweden.

REINALDO P. MACHADO, *Primary Examiner.*

NORTON ANSHER, HARRISON R. MOSELEY,
*Examiners.*